US011893845B2

(12) United States Patent
Nilsson et al.

(10) Patent No.: US 11,893,845 B2
(45) Date of Patent: Feb. 6, 2024

(54) SYSTEM TO PROVIDE ACCESS TO PREMISES THAT COMPRISE ENTRANCES LOCKED BY MEANS OF ELECTROMECHANICAL KEY LOCKS

(71) Applicant: Swedlock AB, Halmstad (SE)

(72) Inventors: Magnus Nilsson, Varberg (SE); Martin Lindvall, Simlångsdalen (SE); Johan Hörberg, Halmstad (SE)

(73) Assignee: Swedlock AB, Halmstad (SE)

( * ) Notice: Subject to any disclaimer, the term of this patent is extended or adjusted under 35 U.S.C. 154(b) by 373 days.

(21) Appl. No.: 17/287,174

(22) PCT Filed: Oct. 31, 2019

(86) PCT No.: PCT/SE2019/051099
§ 371 (c)(1),
(2) Date: Apr. 21, 2021

(87) PCT Pub. No.: WO2020/091682
PCT Pub. Date: May 7, 2020

(65) Prior Publication Data
US 2021/0390808 A1 Dec. 16, 2021

(30) Foreign Application Priority Data

Oct. 31, 2018 (SE) .................... 1851353-1

(51) Int. Cl.
*G07C 9/00* (2020.01)
*G07C 9/27* (2020.01)
(Continued)

(52) U.S. Cl.
CPC ..... *G07C 9/00857* (2013.01); *G07C 9/00309* (2013.01); *G07C 9/27* (2020.01);
(Continued)

(58) Field of Classification Search
CPC .. G07C 9/27; G07C 9/00309; G07C 9/00857; H04M 3/42357; H04M 3/5116; H04M 11/04
(Continued)

(56) References Cited

U.S. PATENT DOCUMENTS

| 6,603,401 B1 | 8/2003 | Ueyama |
| 8,929,912 B1 | 1/2015 | Chitre et al. |

(Continued)

FOREIGN PATENT DOCUMENTS

| CN | 205029794 U | 2/2016 | |
| EP | 2348490 | * 12/2009 | ............... G07C 9/00 |

(Continued)

OTHER PUBLICATIONS

Notice dated Jun. 15, 2021, issued in corresponding Swedish Application No. 1851353-1, filed Oct. 31, 2018, 8 pages.

(Continued)

*Primary Examiner* — Maria El-Zoobi
(74) *Attorney, Agent, or Firm* — Christensen O'Connor Johnson Kindness PLLC

(57) ABSTRACT

The invention concerns a system (1) to provide access to premises (P1-P4) that comprise entrances (E1.1, E1.2, E2-E4) locked by means of electromechanical key locks (L1.1, L1.2, L2-L4), which for locking and unlocking are powered by insertion and actuation of at least one programmable key (24). In said system (1) an administrator (10) contacts a service unit (20) in possession of a programmable key (24) and provides it with synchronization data (13) for an electromechanical key lock (L1.2) of at least one entrance (E1.1) of at least one premise (P1) at an exact geographic position of a site (S).

10 Claims, 3 Drawing Sheets

(51) Int. Cl.
    *H04M 3/42*     (2006.01)
    *H04M 3/51*     (2006.01)
    *H04M 11/04*     (2006.01)

(52) U.S. Cl.
    CPC ..... *H04M 3/42357* (2013.01); *H04M 3/5116* (2013.01); *H04M 11/04* (2013.01); *G07C 2009/00865* (2013.01)

(58) Field of Classification Search
    USPC .......................................................... 379/49
    See application file for complete search history.

(56) References Cited

U.S. PATENT DOCUMENTS

| | | | |
|---|---|---|---|
| 2002/0099945 A1* | 7/2002 | McLintock | G07C 9/27 713/186 |
| 2006/0202009 A1 | 9/2006 | Austin | |
| 2009/0201147 A1 | 8/2009 | Gottlieb | |
| 2015/0022338 A1 | 1/2015 | Hwang et al. | |
| 2016/0019733 A1* | 1/2016 | Robinton | G07C 9/20 340/5.61 |
| 2017/0169699 A1 | 6/2017 | Will et al. | |
| 2017/0289350 A1 | 10/2017 | Philbin | |
| 2019/0187643 A1* | 6/2019 | Carpenter | H04W 4/38 |

FOREIGN PATENT DOCUMENTS

| | | |
|---|---|---|
| EP | 2 348 490 A1 | 7/2011 |
| EP | 2 085 934 B1 | 7/2013 |
| EP | 2 821 970 A1 | 1/2015 |
| JP | 2008-134982 A | 6/2008 |
| JP | 2017-92874 A | 5/2017 |
| WO | 01/41075 A1 | 6/2001 |
| WO | 2014/140810 A1 | 9/2014 |
| WO | 2016/026049 A1 | 2/2016 |
| WO | 2016/092432 A1 | 6/2016 |

OTHER PUBLICATIONS

Extended European Search Report dated Jul. 14, 2022, issued in corresponding European Patent Application No. 19880469.2, filed Oct. 31, 2019, 9 pages.

International Search Report and Written Opinion dated Jan. 31, 2020, issued in corresponding International Application No. PCT/SE2019/051099, filed Oct. 31, 2019, 17 pages.

Notice dated May 22, 2019, issued in corresponding Swedish Application No. 1851353-1, filed Oct. 31, 2018, 7 pages.

\* cited by examiner

SYSTEM TO PROVIDE ACCESS TO PREMISES THAT COMPRISE ENTRANCES LOCKED BY MEANS OF ELECTROMECHANICAL KEY LOCKS

TECHNICAL FIELD

The present invention concerns a system to provide access to premises that comprise entrances locked by means of electromechanical key locks, which for locking and unlocking are powered by insertion and actuation of at least one programmable key.

PRIOR ART

Document EP 2 592 601 B1 reveals electromechanical key locks, which for locking and unlocking are powered by insertion and actuation of programmable keys.

OBJECT OF THE INVENTION

There are numerous situations, in which an administrator sends out service units to perform certain measures at a given geographic site.

When, for instance, an administrator, such as a public safety answering point (PSAP), receives an emergency call or alarm reporting an incident, in the PSAP the geographic position of the incident is determined as exactly as possible, and then, if necessary, at least one rescue force unit is sent to the geographic position determined.

In case the incident has occurred in a premise comprising locked entrances, work of said at least one sent out rescue force unit is facilitated if the rescue force unit in question is equipped with keys providing access through said locked entrances without need to break them open. Regarding traditional, purely mechanical keys, this can be solved for instance by equipping rescue force units with a great number of keys to entrances of a plurality of premises or with master keys fitting key deposits at premise sites. In these key deposits keys fitting the entrances of the premise in question are stored to be used in emergency.

To owners of premises, keys, whether handed out to rescue forces or deposited in key deposits, pose a potential risk of burglary if they get into the wrong hands. From this point of view, electromechanical locks according to the cited prior art are a great improvement, as they use programmable keys, which only if synchronized appropriately render locking and unlocking possible. In other words, a programmable key in itself, handed out to a rescue force unit, does not in itself provide any access.

Now, in case of an emergency when electromechanical locks are at hand and a rescue force unit is equipped with a fitting programmable key, the PSAP if possible provides the rescue force unit with the synchronization data to the premise at the geographic position identified. However, in practice it may show that the geographic position is inexact or that the premise in question is not accessible through the planned entrance. In that case, the rescue force unit at the site can either break another entrance open by force or request alternative synchronization data from the PSAP, both of which is time consuming and detrimental to rescue effectiveness.

Further examples of situations, in which administrators send out service units to perform certain measures at given geographic sites, involve home health aide, garbage collection, delivery of goods, and network maintenance or repair, as well as other fields, within which an administrator can delegate tasks to service units, which need access to locked premises in order to fulfil these tasks.

In the light of the above, it is an object of the present invention to provide an system adapted to provide access to entrances locked by means of electromechanical key locks.

SUMMARY OF THE INVENTION

According to the present invention the above object is achieved by means of a system to provide access to premises that comprise entrances locked by means of electromechanical key locks, which for locking and unlocking are powered by insertion and actuation of at least one programmable key, said system comprising
  an administrator that receives and/or manages request and initiates measures based on said requests, and
  service units that can be contacted by the administrator and sent to premises with entrances locked by means of electromechanical key locks in order to take measures,
  wherein the administrator has access to maps that show geographic positions of said premises and their entrances locked by means of said electromechanical key locks, and has access to synchronization data, which, when transferred to a programmable key, allow the programmable key to power and actuate fitting electromechanical key locks,
  wherein said service units are equipped with programmable keys, to which synchronization data received from the administrator can be transferred to provide access to fitting electromechanical key locks of premises, and
  wherein synchronization data received from the administrator by a specific service unit comprises synchronization data for at least one entrance of at least one premise at an exact geographic position.

As the electromechanical key locks are powered by programmable keys inserted therein, the locks in question are not connected to any network which is accessible to the administrator. Hence, the administrator cannot directly open locked entrances to a service unit at site, but only provide said service unit with the necessary synchronization data. However, the administrator can according to the invention provide a service unit at site with all necessary means to access relevant premises with entrances, which are locked by means of electromechanical key locks.

Preferably, in the system said service units are equipped with key interfaces, which can communicate with the administrator and render transmission of synchronization data received from the administrator to programmable keys possible. Such key interfaces are easy to install for instance in vehicles and provide a safe means to transmit the necessary data to a programmable key.

Preferably, in the system the administrator can provide said specific service unit with a specific pin code, which when entered into a key pad of a key interface of said specific service unit initiates transmission of specific synchronization data to a programmable key communicating with the key interface. A specific pin code does further improve safety against undue use.

Preferably, in the system synchronization data sent by the administrator and transferred to a programmable key are valid only for a limited time interval. A limited time interval does also improve safety against undue use.

Preferably, in the system said service units are equipped with means to restart said limited time interval at least once. By rendering restart of the limited time interval possible, it is at site possible to easy adapt to unexpected situations, for instance if a service unit is behind schedule or in case of unexpected events.

According to one embodiment, the administrator is a public safety answering point (PSAP), which receives and/ or manages requests consisting of emergency calls and/or alarms and initiates rescue measures, wherein said service units are rescue force units, which by said PSAP can be sent to an emergency site where rescue measures are required, and wherein synchronization data received from said PSAP by a specific rescue force unit comprises synchronization data for at least one entrance of a premise at an exact geographic position of the emergency site as well as synchronization data for at least one further entrance of a premise in a zone adjoining said exact geographic position. As the electromechanical key locks are powered by programmable keys inserted therein, the locks in question are not connected to any network which is accessible to the administrator. Hence, the administrator cannot directly open locked entrances to a service unit at site, but only provide said service unit with the necessary synchronization data. However, as the exact geographic position sometimes is not known, or a planned entrance is blocked, for instance due to fire, the PSAP does according to the invention provide said rescue force unit with synchronization data for at least one further entrance, such that the rescue force unit without delay is provided with alternative access ways within a reasonable area adjoining the exact geographic position determined by the PSAP.

Preferably, said PSAP has access to data about specific rescue force units, and size of said zone adjoining said exact geographic position is determined by said PSAP depending on the type of emergency call and/or alarm and on the type of said specific rescue force unit. The advantage of this embodiment is that the adjoining area can be adapted to the needs expected on site. Thus, in case of fire a larger zone is likely of need for instance for evacuation purposes, whereas a single case of acute illness is likely to require just a minor zone, for instance due to uncertainty about the exact geographic position.

According to another embodiment, the administrator is an office, which receives and/or manages requests concerning home health aide, wherein home health aide units are sent by said office to premises where home health aide measures are required, and wherein synchronization data received from said office by a specific home health aide unit comprises synchronization data for at least one entrance of a premise at an exact geographic position of a premise along a defined route. Contrary to the embodiment comprising a PSAP, an office dealing with home health aid has good knowledge of the premises to be visited by a home health aid unit along a route. Hence, it suffices to provide such a home health aide unit with access only to specific premises to be visited along the route. However, as such a route can differ from one day to another, or even during a day, from a safety point of view it is wise to limit the time during which the key can be used or the number of times it can be used without updating.

According to a further embodiment of the present invention, the administrator of the system comprises of a control center, which receives and/or manages requests concerning garbage collection, wherein said service units are garbage collection units, which by said control center are sent along a collection route where garbage collection is required, and wherein synchronization data received from said control center by a specific garbage collection unit comprises synchronization data for at least one entrance of a premise at an exact geographic position of a premise along said collection route. In this case the present invention renders it possible to easily adapt a route to be followed by a garbage collection unit to an actual demand and to assure by means of the electromechanical keys that the garbage collection unit has access only to chosen premises along that route.

According to yet another embodiment of the present invention, the system administrator is a logistics service provider, which receives and/or manages requests concerning delivery of goods, wherein said service units are carrier units, which by said control center are sent along a delivery route where goods are to be delivered or from where goods are to be picked up, and wherein synchronization data received from said logistics service provider by a specific carrier unit comprises synchronization data for at least one entrance of a premise at an exact geographic position of a premise along said delivery route. An advantage of such a system is that a customer waiting for a delivery or pick up can decide if an entrance of a premise is to be opened at all and, if so, which exact entrance (the main building or an annex, such as a garage).

According to a further embodiment, the system can be used in a network, in which the administrator is a network operator, which receives and/or manages requests concerning network measures, wherein said service units are network maintenance or repair units, which by said network operator are sent to an area where network maintenance or repair measures are required, and wherein synchronization data received from said network operator by a specific maintenance or repair unit comprises synchronization data for at least one entrance of a premise at an exact geographic position of a site within said area. A big advantage of such a system is that it is very versatile. Thus, it is easily adaptable to different qualifications of personal involved and easily adaptable to unusual events, such as large-scale power shortages due to e.g. storms.

DETAILED DESCRIPTION OF THE PREFERRED EMBODIMENTS

Figure 1:
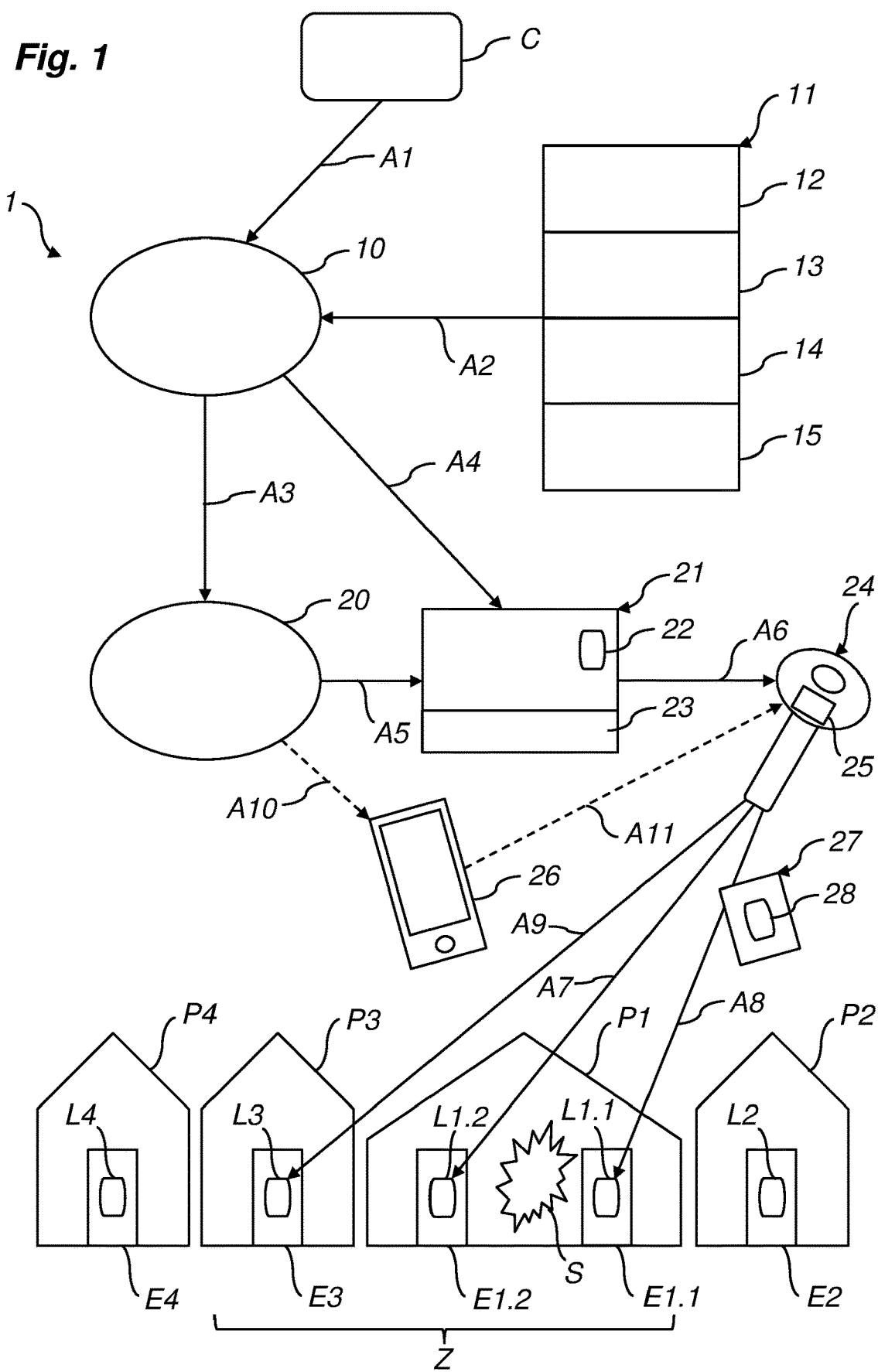
FIGS. 1-3 illustrate preferred embodiments of the present invention by means of block diagrams, which for simplicity use identical reference signs to depict alike steps or measures.

In the block diagram of FIG. 1 reference 1 generally depicts a rescue system according to a first embodiment of the invention, which is useful especially in emergency cases. A central unit in this system is an administrator, such as a public safety answering point (in short, a PSAP) 10. The PSAP 10 is arranged to receive emergency calls and/or alarms C, which is illustrated by means of an arrow A1 that just like other arrows is used in FIG. 1 to indicate communication paths of the rescue system 1. A call and/or alarm can be initiated manually and/or automatically and should provide the PSAP 10 with at least some information about the type of emergency and about the geographic position of an emergency site.

As illustrated by arrow A2, the PSAP 10 has access to at least one data base, which is generally illustrated by means of a single block depicted 11, but could comprise of several data bases, including external or cloud data bases. In the data base 11 detailed maps 12 are stored, which comprise geographic data including data about premises P1-P4 and entrances E1.1, E1.2, E2-E4 of these.

In the rescue system 1 according to the first embodiment of the invention said entrances E1.1, E1.2, E2-E4 are locked by means of electromechanical key locks L1.1, L1.2, L2-L4. These are for locking and unlocking powered by insertion and actuation of programmable keys, of which one is shown and depicted 24. Each such key 24 comprises a battery powered control unit 25, which for programming purposes can be accessed either by physical contact, by near field communication, such as NFC, or by Bluetooth. It can store all data necessary to access at least one specific electromechanical key lock L1.1, L1.2, L2-L4, but cannot access any electromechanical key locks L1.1, L1.2, L2-L4 for which it does not have the appropriate data.

In the data base 11 of the PSAP 10, block 13 illustrates a register that holds synchronization data, which is provided to the PSAP 10 by a provider of the electromechanical key locks L1.1, L1.2, L2-L4. The synchronization data 13 comprises all data needed, which, if transferred to a programmable key 24, temporarily allows that programmable key 24 to access, that is to power and actuate, a specific electromechanical key lock L1.1, L1.2, L2-L4. How data transfer can be made, will be described in detail below.

A further block 14 of the data base 11 illustrates a register that provides data to the PSAP 10 about the rescue force units 20 available and about their capacity, such as police, ambulance or fire brigade. Such data 14 is important to know for personal at the PSAP 10 in order to be able to coordinate available resources in the best way.

A fourth and final block 15 of the data base 11 illustrates a register that can hold pin codes that can be used as an extra safety precaution to hinder undue use of electromechanical keys 24. Use of such pin codes will be described in detail below.

Now, in case of emergency, for instance a fire at an emergency site S, by means of available maps 12 and information from a caller or alarm C the PSAP 10 localizes the site S as exactly as possible and decides on which rescue forces are to be sent out. Then a specific rescue force unit 20 is contacted (cf. arrow A3) and informed of the emergency at the same time as synchronization data 13 for a programmable key 24 are sent to a key interface 21, which besides a programmable key 24 is available to the specific rescue force unit 20 (cf. arrow A4). The synchronization data 13 comprises necessary data to access, that is power and unlock, an electromechanical lock L1.2 of an entrance E1.2 of the premise P1 by means of a programmable key 24, but also necessary data to access an electromechanical lock L1.1 of a second entrance E1.1 of the premise P1 as well as necessary data to access an electromechanical lock L3 of an entrance E2 of a neighboring premise P3. The extra accessibility is provided by the PSAB 10 to speed up rescue actions at the emergency site S, which in case of fire often requires evacuation measures. Hence, providing possible access to nearby entrances E1.1 and E3 facilitates rescue actions at the emergency site S.

Having received a rescue order, personnel at the specific rescue force unit 20 can now insert their programmable key (or keys) 24 into a key hole 22 of their key interface 21 (cf. arrow A5) in order to transfer said synchronization data 13 to it (cf. arrow A6) by physical contact (or wireless according to the above). Transfer can for safety reasons require entering of a pin code 15 on a key pad 23 of the key interface 21, which can be available beforehand to the rescue force unit 20 or be sent out separately by the PSAP 10.

At the emergency site S, which in the case illustrated is localized at premise P1 with its two entrances E1.1 and E1.2, the rescue force unit 20 can use their programmable key 24, now containing necessary synchronization data 13, into locks L1.2, L1.1 and L3 of entrances E1.2, E1.1 and E3 of premises P1 and P3 in order to gain easy and swift access (cf. arrows A7, A8 and A9), while entrances E2 and E4 of premises P2 and P4 remain locked and inaccessible.

As an extra safety measure, it is possible to limit time, during which synchronization data 13 are valid, to limit the number of times a programmable key 24 can use said data and/or to prescribe entering of a pin code 15 to activate them. The pin code 15 can be one received from the PSAP 10 and relayed (cf. arrow A10) to a cell phone 26 which is available to the rescue force unit 20 and for instance has NFC capability. The cell phone 26 is then used to transfer the pin code 15 to the programmable key 24 (cf. arrow A11), a process which for protocol reasons could be required for each electromechanical lock L1.2, L1.1 and L3 the rescue force unit 20 wishes to open and could be used to override a counter counting the number of key uses. Then, as an alternative or complement, the rescue force unit 20 could also be equipped with a means 27 to restart the limited time interval for key use. Such a means 27 can comprise a simple box comprising a key hole 28 and necessary electronics to physically initiate time reset a limited couple of times.

An extra advantage of the rescue system 1 according to the invention is that it is adaptable to different emergencies. Thus, in case an emergency requires pickup by ambulance at an emergency site S, in the illustrated case the PSAP 10 is likely to provide synchronization data 13 only for the exact entrance, if known, e.g. entrance E1.2 and electromechanical key lock L1.2, and, if not exactly known, for entrances E1.1 and E1.2 and their electromechanical key locks L1.1 and L1.2. On the other hand, should an emergency concern outbreak of a big fire at an emergency site S, in the illustrated case the PSAP 10 is likely to provide synchronization data 13 for all four premises P1-P4, that is for entrances E1.1, E1.2, E2-E4 and their electromechanical key locks L1.1, L1.2, L2-L4. Further, it is apparent from the above that different rescue force units 20 can be provided with synchronization data 13 for differently sized areas around an emergency site.

Figure 2:
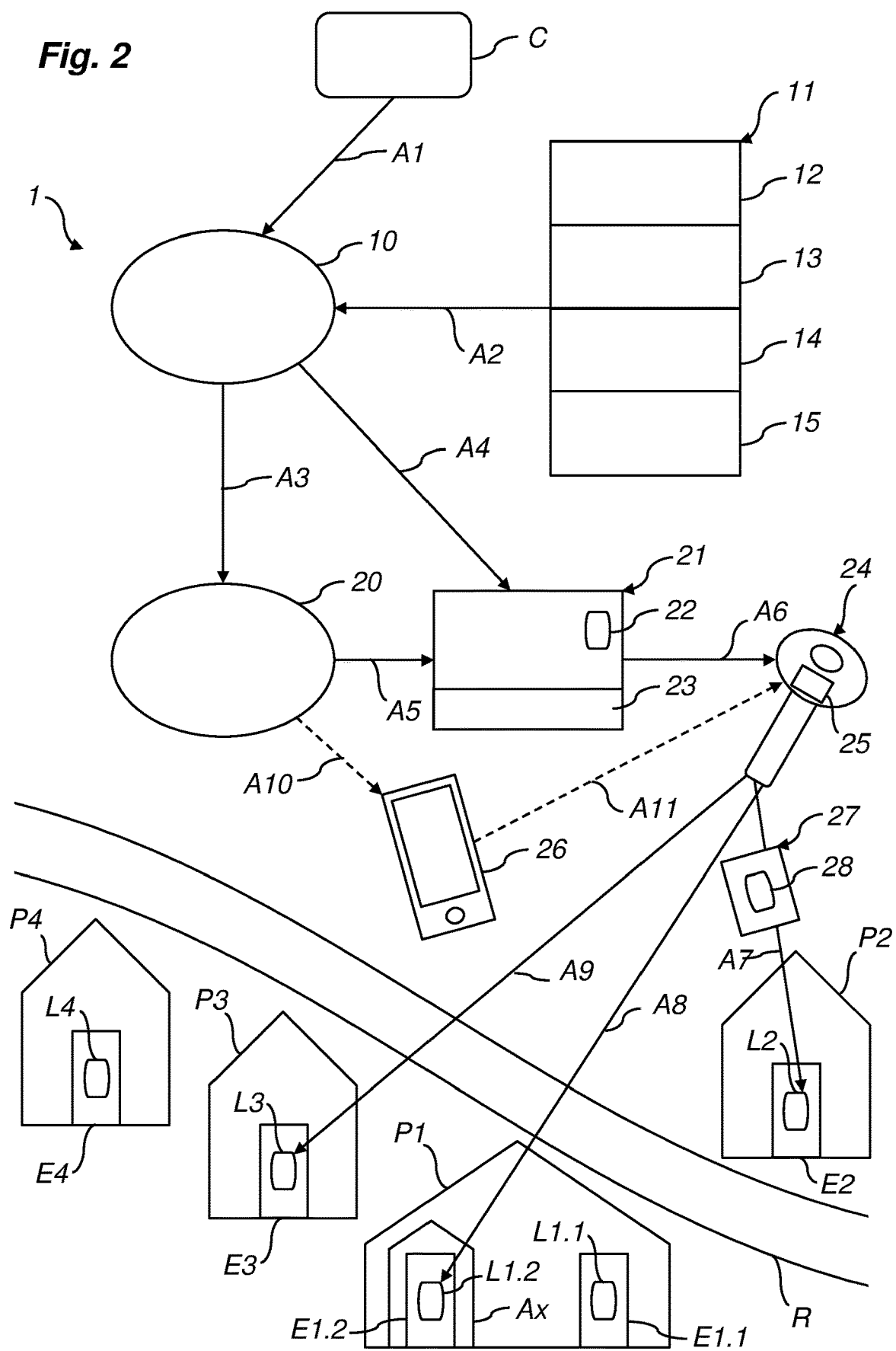

In the block diagram of FIG. 2 reference 1 generally depicts a system 1 according to a second embodiment of the invention, which is useful especially when service units are to follow a given route. A central unit in this system 1 is an office 10 arranged to receive and/or manage requests C concerning home health aide, which is illustrated by means of an arrow A1 that just like other arrows is used in FIG. 2 to indicate communication paths of the system 1. A request C concerning home health aide can be initiated for instance by a health center and should provide the office 10 with personal information, such as medicine to be administered, and about the or address geographic position of a premise P1-P4 to be visited.

As illustrated by arrow A2, the office 10 has access to at least one data base, which is generally illustrated by means of a single block depicted 11, but could comprise of several data bases, including external or cloud data bases. In the data base 11 detailed maps 12 are stored, which comprise address or geographic data including data about premises P1-P4 and entrances E1.1, E1.2, E2-E4 of these.

In the system 1 according to the second embodiment of the invention said entrances E1.1, E1.2, E2-E4 are locked by means of electromechanical key locks L1.1, L1.2, L2-L4. These are for locking and unlocking powered by insertion and actuation of programmable keys, of which one is shown and depicted 24. Each such key 24 comprises a battery powered control unit 25, which for programming purposes can be accessed either by physical contact, by near field communication, such as NFC, or by Bluetooth. It can store all data necessary to access at least one specific electromechanical key lock L1.1, L1.2, L2-L4, but cannot access any electromechanical key locks L1.1, L1.2, L2-L4 for which it does not have the appropriate data.

In the data base 11 of the office 10, block 13 illustrates a register that holds synchronization data, which is provided to the office 10 by a provider of the electromechanical key locks L1.1, L1.2, L2-L4. The synchronization data 13 comprises all data needed, which, if transferred to a programmable key 24, temporarily allows that programmable key 24 to access, that is to power and actuate, a specific electromechanical key lock L1.1, L1.2, L2-L4. How data transfer can be made, will be described in detail below.

A further block 14 of the data base 11 illustrates a register that provides data to the office 10 about the service units 20 available and about their capacity, such as the number of personal or rights to administer medicine. Such data 14 is important to know for personal at the office 10 in order to be able to coordinate available resources in the best way.

A fourth and final block 15 of the data base 11 illustrates a register that can hold pin codes that can be used as an extra safety precaution to hinder undue use of electromechanical keys 24. Use of such pin codes will be described in detail below.

Now, when a premise P1-P4 is to be visited, by means of available maps 12 and information from the request C, the office 10 decides on which service unit is to be sent out and when. Then a specific service unit 20 is contacted (cf. arrow A3) and informed of the request at the same time as synchronization data 13 for a programmable key 24 are sent to a key interface 21, which besides a programmable key 24 is available to the specific service unit 20 (cf. arrow A4). The synchronization data 13 comprises necessary data to access, that is power and unlock, e.g. an electromechanical lock L1.1 of an entrance E1.1 of the premise P1 by means of a programmable key 24, but sometimes also necessary data to access a further electromechanical lock L1.2 of a second entrance E1.2 of the premise P1, for instance in order to be able to dispose garbage in an annex Ax of the premise P1.

Having received the necessary data from the office 10, personnel of the service unit 20 can now insert their programmable key (or keys) 24 into a key hole 22 of their key interface 21 (cf. arrow A5) in order to transfer said synchronization data 13 to it (cf. arrow A6) by physical contact (or wireless according to the above). Transfer can for safety reasons require entering of a pin code 15 on a key pad 23 of the key interface 21, which can be available beforehand to the service unit 20 or be sent out separately by the office 10.

When in place at for instance premise P1 with its two entrances E1.1 and E1.2, the service unit 20 can use their programmable key 24, now containing necessary synchronization data 13, into lock L1.1 to open entrance E1.1 in order to gain access, and later on perhaps to lock L1.1 of a second entrance of premise P1 or to other locks L2 and L3 of entrances E2 and E3 of other premises P2 and P3 along a route R (cf. arrows A7, A8 and A9), while entrance E4 of premise P4 remains locked and inaccessible.

As an extra safety measure, it is possible to limit time, during which synchronization data 13 are valid, to limit the number of times a programmable key 24 can use said data and/or to prescribe entering of a pin code 15 to activate them. The pin code 15 can be one received from the office 10 and relayed (cf. arrow A10) to a cell phone 26 which is available to the service unit 20 and for instance has NFC capability. The cell phone 26 is then used to transfer the pin code 15 to the programmable key 24 (cf. arrow A11), a process which for protocol reasons could be required for each electromechanical lock L1.1, L1.2, L3 and L3 the service unit 20 wishes to open and could be used to override a counter counting the number of key uses. Then, as an alternative or complement, the service unit 20 could also be equipped with a means 27 to restart the limited time interval for key use. Such a means 27 can comprise a simple box comprising a key hole 28 and necessary electronics to physically initiate time reset a limited couple of times.

The system according to the second embodiment shown in FIG. 2 could just as well be used for other purposes, such as garbage collection or delivery of goods. In the garbage collection case the administrator would be a control center 10, and the service units would be garbage collection units 20. In the goods delivery case the administrator would be a logistics service provider 20, and the service units would be carrier units 20. In both cases the units 20 would follow a given route, but they would likely be granted access not to a premise as such, but to an annex Ax thereof for pick up or delivery (c.f. arrow A8 and lock L1.2 in FIG. 2).

Figure 3:
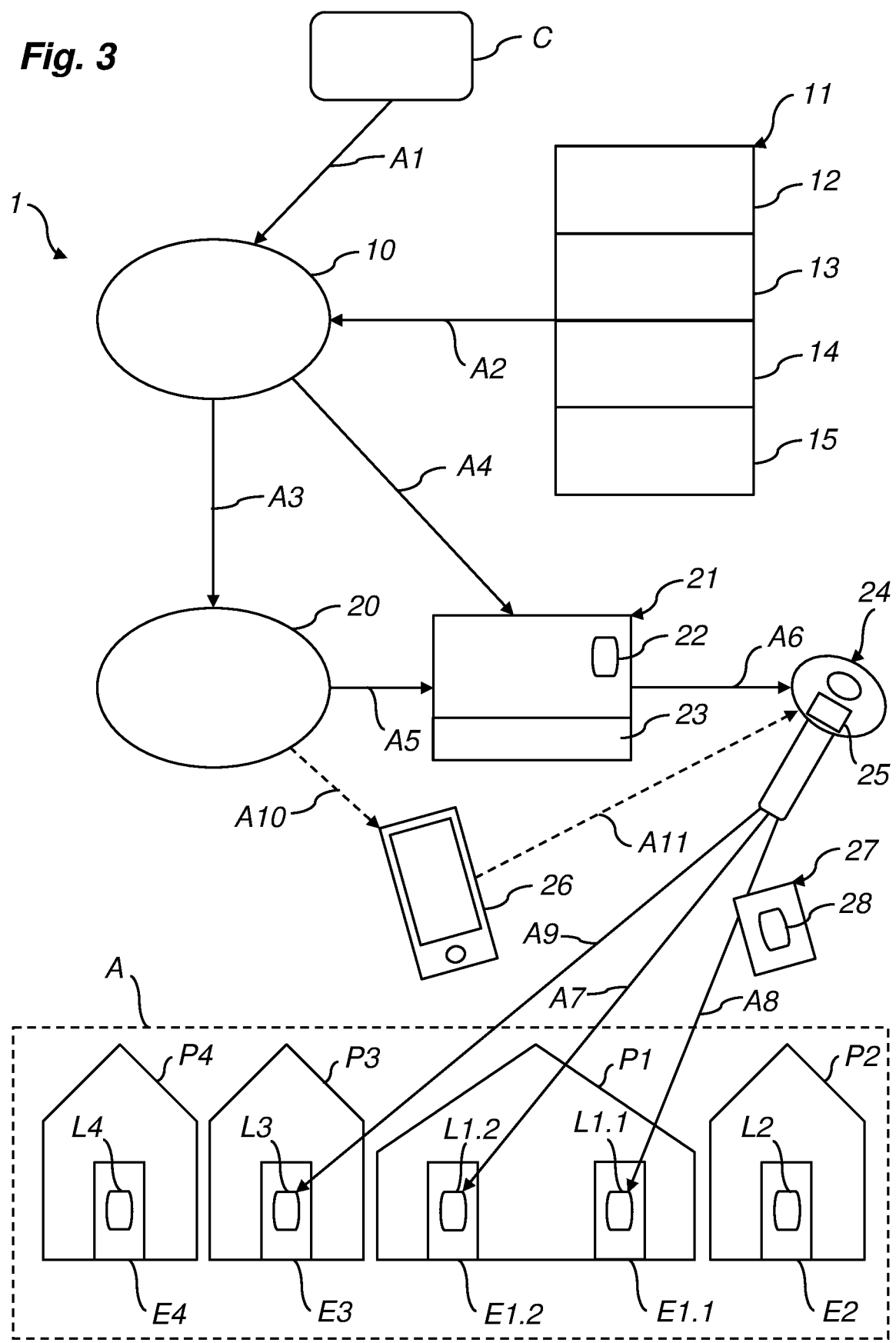

In the block diagram of FIG. 3 reference 1 generally depicts a system 1 according to a third embodiment of the invention, which is useful especially when service units 20, such as network maintenance or repair units, are sent out to perform maintenance or repair work within a geographic area A. The administrator of this system 1 is a network operator 10. The network operator 10 receives and/or manages requests or alarms C concerning necessary network measures, which is illustrated by means of an arrow A1 that just like other arrows is used in FIG. 3 to indicate communication paths within the system 1. A request and/or alarm C can be initiated manually and/or automatically and should provide the network operator 10 with at least some information about the type of the case at hand and about the geographic position of the site in question.

As illustrated by arrow A2, the network operator 10 has access to at least one data base, which is generally illustrated by means of a single block depicted 11, but could comprise of several data bases, including external or cloud data bases. In the data base 11 detailed maps 12 are stored, which comprise geographic data including data about premises P1-P4 and entrances E1.1, E1.2, E2-E4 of these. In the case at hand such premises P1-P4 would typically be transformer stations or the like, to which access is strictly limited.

In the system 1 according to the third embodiment of the invention said entrances E1.1, E1.2, E2-E4 are locked by means of electromechanical key locks L1.1, L1.2, L2-L4. These are for locking and unlocking powered by insertion and actuation of programmable keys, of which one is shown and depicted 24. Each such key 24 comprises a battery powered control unit 25, which for programming purposes can be accessed either by physical contact, by near field communication, such as NFC, or by Bluetooth. It can store all data necessary to access at least one specific electromechanical key lock L1.1, L1.2, L2-L4, but cannot access any electromechanical key locks L1.1, L1.2, L2-L4 for which it does not have the appropriate data.

In the data base 11 of the network operator 10, block 13 illustrates a register that holds synchronization data, which is provided to the network 10 by a provider of the electromechanical key locks L1.1, L1.2, L2-L4. The synchronization data 13 comprises all data needed, which, if transferred to a programmable key 24, temporarily allows that programmable key 24 to access, that is to power and actuate, a specific electromechanical key lock L1.1, L1.2, L2-L4. How data transfer can be made, will be described in detail below.

A further block 14 of the data base 11 illustrates a register that provides data to the network operator 10 about the service units 20 available and about their capacity, such as repair or maintenance. Such data 14 is important to know for personal at the network operator 10 in order to be able to coordinate available resources in the best way.

A fourth and final block 15 of the data base 11 illustrates a register that can hold pin codes that can be used as an extra safety precaution to hinder undue use of electromechanical keys 24. Use of such pin codes will be described in detail below.

Now, when there for instance is a power shortage alarm C within area A, by means of available maps 12 and information available the network operator 10 localizes the site as exactly as possible and decides on which service unit to send out. Then a specific service unit 20 is contacted (cf. arrow A3) and informed of the case at hand at the same time as synchronization data 13 for a programmable key 24 are sent to a key interface 21, which besides a programmable key 24 is available to the specific service unit 20 (cf. arrow A4). The synchronization data 13 comprises necessary data to access, that is power and unlock, for instance the electromechanical locks L1.1, L1.2 and L3 of the entrances E1.1, E1.2 and E3 of premises P1 and P3 within the area A by means of a programmable key 24, but not for the electromechanical locks L2 and L4 of entrances E2 and E4 of premises P2 and P4, e.g. due to the fact that premises P2 and P4 are wind power plants, which are not directly involved in the power shortage at hand.

Having received all necessary data, personnel at the specific service unit 20 can now insert their programmable key (or keys) 24 into a key hole 22 of their key interface 21 (cf. arrow A5) in order to transfer said synchronization data 13 to it (cf. arrow A6) by physical contact (or wireless according to the above). Transfer can for safety reasons require entering of a pin code 15 on a key pad 23 of the key interface 21, which can be available beforehand to the rescue force unit 20 or be sent out separately by the PSAP 10.

On site within the area A, the service unit 20 can insert their programmable key 24, now containing necessary synchronization data 13, into locks L1.1, L1.2 and L3 of entrances E1.1, E1.2 and E3 of premises P1 and P3 in order to gain easy and swift access (cf. arrows A7, A8 and A9), while entrances E2 and E4 of premises P2 and P4 remain locked and inaccessible.

As an extra safety measure, it is possible to limit time, during which synchronization data 13 are valid, to limit the number of times a programmable key 24 can use said data and/or to prescribe entering of a pin code 15 to activate them. The pin code 15 can be one received from the network operator 10 and relayed (cf. arrow A10) to a cell phone 26 which is available to the service unit 20 and for instance has NFC capability. The cell phone 26 is then used to transfer the pin code 15 to the programmable key 24 (cf. arrow A11), a process which for protocol reasons could be required for each electromechanical lock L1.1, L1.2 and L3 the service unit 20 wishes to open and could be used to override a counter counting the number of key uses. Then, as an alternative or complement, the service unit 20 could also be equipped with a means 27 to restart the limited time interval for key use. Such a means 27 can comprise a simple box comprising a key hole 28 and necessary electronics to physically initiate time reset a limited couple of times.

An extra advantage of the system 1 according to the third embodiment of the invention is that it is easily adaptable to different situations. Thus, in case of a large power shortage due to a storm, which makes it impossible for a network operator 10 to exactly pin a site concerned, it is possible for the network operator 10 to provide a service unit 20 with the necessary data to gain access to all premises P1-P4 within an area and to prolong the time limits, during which such access is allowed.

The invention claimed is:

1. A system to provide access to premises that comprise entrances locked by means of electromechanical key locks, which for locking and unlocking are powered by insertion and actuation of at least one programmable key, said system comprising
    an administrator that receives and/or manages requests and initiates measures based on said requests, and
    service units that can be contacted by the administrator and sent to premises with entrances locked by means of electromechanical key locks in order to take measures,
    wherein the administrator has access to maps that show geographic positions of said premises and their entrances locked by means of said electromechanical key locks, and has access to synchronization data, which, when transferred to a programmable key, allow the programmable key to power and actuate fitting electromechanical key locks,
    wherein said service units are equipped with programmable keys, to which synchronization data received from the administrator can be transferred to provide access to fitting electromechanical key locks of premises,
    wherein synchronization data received from the administrator by a specific service unit comprises synchronization data for at least one entrance of at least one premise at an exact geographic position of a site; and
    wherein the administrator is a public safety answering point (PSAP), which receives and/or manages requests consisting of emergency calls and/or alarms and initiates rescue measures, wherein said service units are rescue force units, which by said PSAP can be sent to an emergency site where rescue measures are required, and wherein synchronization data received from said PSAP by a specific rescue force unit comprises synchronization data for at least one entrance of a premise at an exact geographic position of the emergency site as well as synchronization data for at least one further entrance of a premise in a zone adjoining said exact geographic position.

2. The system according to claim 1, wherein said service units are equipped with key interfaces, which can communicate with the administrator and render transmission of synchronization data received from the administrator to programmable keys possible.

3. The system according to claim 2, wherein the administrator can provide said specific service unit with a specific pin code, which when entered into a key pad of a key interface of said specific service unit initiates transmission of specific synchronization data to a programmable key communicating with the key interface.

4. The system according to claim 1, wherein synchronization data sent by the administrator and transferred to a programmable key are valid only for a limited time interval.

5. The system according to claim 4, wherein said service units are equipped with means to restart said limited time interval at least once.

6. The system-according to claim 1,
    wherein said PSAP has access to data about specific rescue force units, and wherein size of said zone adjoining said exact geographic position is determined by said PSAP depending on the type of emergency call and/or alarm and on the type of said specific rescue force unit.

7. The system according to claim 1, wherein the administrator is an office, which receives and/or manages requests concerning home health aide, wherein home health aide units are sent by said office to premises where home health care measures are required, and wherein synchronization data received from said office by a specific home health aide unit comprises synchronization data for at least one entrance of a premise at an exact geographic position of a premise along a defined route.

8. The system according to claim 1, wherein the administrator is a control center, which receives and/or manages requests concerning garbage collection, wherein said service units are garbage collection units, which by said control center are sent along a collection route where garbage collection is required, and wherein synchronization data received from said control center by a specific garbage collection unit comprises synchronization data for at least one entrance of a premise at an exact geographic position of a premise along said collection route.

9. The system according to claim 1, wherein the administrator is a logistics service provider, which receives and/or manages requests concerning delivery of goods, wherein said service units are carrier units, which by said control center are sent along a delivery route where goods are to be delivered or from where goods are to be picked up, and wherein synchronization data received from said logistics service provider by a specific carrier unit comprises synchronization data for at least one entrance of a premise at an exact geographic position of a premise along said delivery route.

10. The system according to claim 1, wherein the administrator is a network operator, which receives and/or manages requests concerning network measures, wherein said service units are network maintenance or repair units, which by said network operator are sent to an area where network maintenance or repair measures are required, and wherein synchronization data received from said network operator by a specific maintenance or repair unit comprises synchronization data for at least one entrance of a premise at an exact geographic position of a site within said area.

* * * * *